United States Patent
Louch

(10) Patent No.: US 9,921,713 B2
(45) Date of Patent: Mar. 20, 2018

(54) TRANSITIONAL DATA SETS

(71) Applicant: Apple Inc., Cupertino, CA (US)

(72) Inventor: John O. Louch, San Luis Obispo, CA (US)

(73) Assignee: Apple Inc., Cupertino, CA (US)

( * ) Notice: Subject to any disclaimer, the term of this patent is extended or adjusted under 35 U.S.C. 154(b) by 392 days.

(21) Appl. No.: 13/854,811

(22) Filed: Apr. 1, 2013

(65) Prior Publication Data

US 2014/0101613 A1    Apr. 10, 2014

Related U.S. Application Data

(63) Continuation of application No. 12/035,300, filed on Feb. 21, 2008, now Pat. No. 8,412,150.

(51) Int. Cl.
*G06F 3/048* (2013.01)
*G06F 3/0481* (2013.01)
*H04M 1/725* (2006.01)
*G06F 3/0488* (2013.01)

(52) U.S. Cl.
CPC ........ *G06F 3/04817* (2013.01); *G06F 3/0488* (2013.01); *H04M 1/72572* (2013.01); *H04M 1/72586* (2013.01); *H04M 2250/10* (2013.01); *H04M 2250/12* (2013.01); *H04M 2250/22* (2013.01); *H04M 2250/52* (2013.01)

(58) Field of Classification Search
CPC .... H04N 5/44543; H04W 4/02; H04W 4/021; H04W 4/023; H04W 4/025; H04W 4/04; H04W 4/022; H04W 4/026–4/028; H04W 4/043; H04W 4/046; G01C 21/3602; G01C 21/3679; G01C 21/3682; G01C 21/3691; G01C 21/3694; G06F 3/0481; G06F 3/04817; G06F 3/0482; G06F 3/0488; G06F 9/4443
See application file for complete search history.

(56) References Cited

U.S. PATENT DOCUMENTS

| | | | |
|---|---|---|---|
| 6,323,846 B1 | 11/2001 | Westerman et al. | |
| 6,570,557 B1 | 5/2003 | Westerman et al. | |
| 6,677,932 B1 | 1/2004 | Westell | |
| 7,069,239 B2* | 6/2006 | Fawcett | G06Q 10/087 705/22 |
| 7,149,983 B1* | 12/2006 | Robertson | G06F 17/30398 715/763 |
| 7,366,721 B1* | 4/2008 | Bennett | G06F 17/30873 707/959 |
| 8,412,150 B2 | 4/2013 | Louch | |
| 2002/0015024 A1 | 2/2002 | Westerman et al. | |
| 2002/0075329 A1* | 6/2002 | Prabhu | G06F 3/0481 715/854 |
| 2003/0093476 A1* | 5/2003 | Syed | 709/204 |

(Continued)

FOREIGN PATENT DOCUMENTS

WO    WO 2007145619 A1 *  12/2007  ............... G09B 7/00

*Primary Examiner* — Shourjo Dasgupta
(74) *Attorney, Agent, or Firm* — Fish & Richardson P.C.

(57) ABSTRACT

A set of applications on a mobile device can be specified, presented and automatically populated with transitional data sets. The transitional data sets can be stored on a network to facilitate computations of differences between transitional data sets and other data sets, and the differences can be presented on the mobile device by one or more location-aware applications.

20 Claims, 6 Drawing Sheets

(56) References Cited

U.S. PATENT DOCUMENTS

| | | | |
|---|---|---|---|
| 2003/0131007 A1* | 7/2003 | Schirmer | G06F 17/30958 |
| 2004/0203909 A1* | 10/2004 | Koster | 455/456.1 |
| 2005/0130680 A1* | 6/2005 | Northcutt | H04M 1/72572 455/457 |
| 2005/0149951 A1* | 7/2005 | Uola et al. | 719/328 |
| 2006/0212327 A1* | 9/2006 | Norman | G06Q 10/00 705/7.23 |
| 2006/0277205 A1* | 12/2006 | Song | G06N 5/02 |
| 2007/0061724 A1* | 3/2007 | Slothouber | G06F 8/38 715/716 |
| 2007/0129880 A1* | 6/2007 | Thacher | G01C 21/26 701/533 |
| 2007/0150368 A1* | 6/2007 | Arora | G06Q 30/02 705/26.1 |
| 2008/0022298 A1* | 1/2008 | Cavicchia | H04N 5/44543 725/25 |
| 2008/0040488 A1* | 2/2008 | Gupta | H04L 67/16 709/227 |
| 2008/0133336 A1* | 6/2008 | Altman et al. | 705/10 |
| 2008/0167078 A1 | 7/2008 | Eibye | |
| 2008/0215998 A1* | 9/2008 | Moore | G06F 9/4443 715/762 |
| 2008/0294751 A1* | 11/2008 | Dreiling | 709/219 |
| 2009/0049401 A1* | 2/2009 | Miller | G06Q 10/06 715/810 |
| 2009/0085745 A1* | 4/2009 | Gupta | G06Q 10/087 340/572.1 |
| 2009/0088964 A1* | 4/2009 | Schaaf | G01C 21/367 701/532 |
| 2009/0097474 A1* | 4/2009 | Ray | H04L 45/306 370/352 |
| 2009/0163182 A1* | 6/2009 | Gatti et al. | 455/414.1 |
| 2009/0182501 A1* | 7/2009 | Fyke et al. | 701/208 |
| 2009/0189811 A1* | 7/2009 | Tysowski | G01S 19/14 342/357.34 |
| 2009/0209267 A1* | 8/2009 | Jagetiya | 455/456.1 |
| 2009/0209270 A1* | 8/2009 | Gutierrez | G06F 17/3087 455/456.3 |
| 2009/0215497 A1 | 8/2009 | Louch | |

* cited by examiner

TRANSITIONAL DATA SETS

TECHNICAL FIELD

This subject matter is generally related to graphical user interfaces for mobile devices.

BACKGROUND

Conventional computer operating systems often provide user interfaces in which a number of windows can be displayed, overlapped, resized, moved, configured, and reformatted according to the needs of the user or an application. Taskbars, menus, virtual buttons and other user interface elements provide mechanisms for accessing and activating windows. Although users often appreciate the benefits provided by windows, many users also find such conventional user interface elements difficult to navigate.

The deficiencies of conventional user interface elements are compounded on mobile devices, where a limited display area makes it difficult to design a user interface that can be easily navigated by a user. Due to a large number of applications available to a user on a mobile device, a virtual desktop of a mobile device can become cluttered with application icons, making the desktop difficult to navigate. Moreover, a user may only need to access a subset of application icons for a given task at a given time.

SUMMARY

A set of applications on a mobile device can be specified, presented and automatically populated with transitional data sets. The transitional data sets can be stored on a network to facilitate computations of differences between transitional data sets and other data sets, and the differences can be presented on the mobile device by one or more location-aware applications.

DETAILED DESCRIPTION

Example Mobile Device

Figure 1:
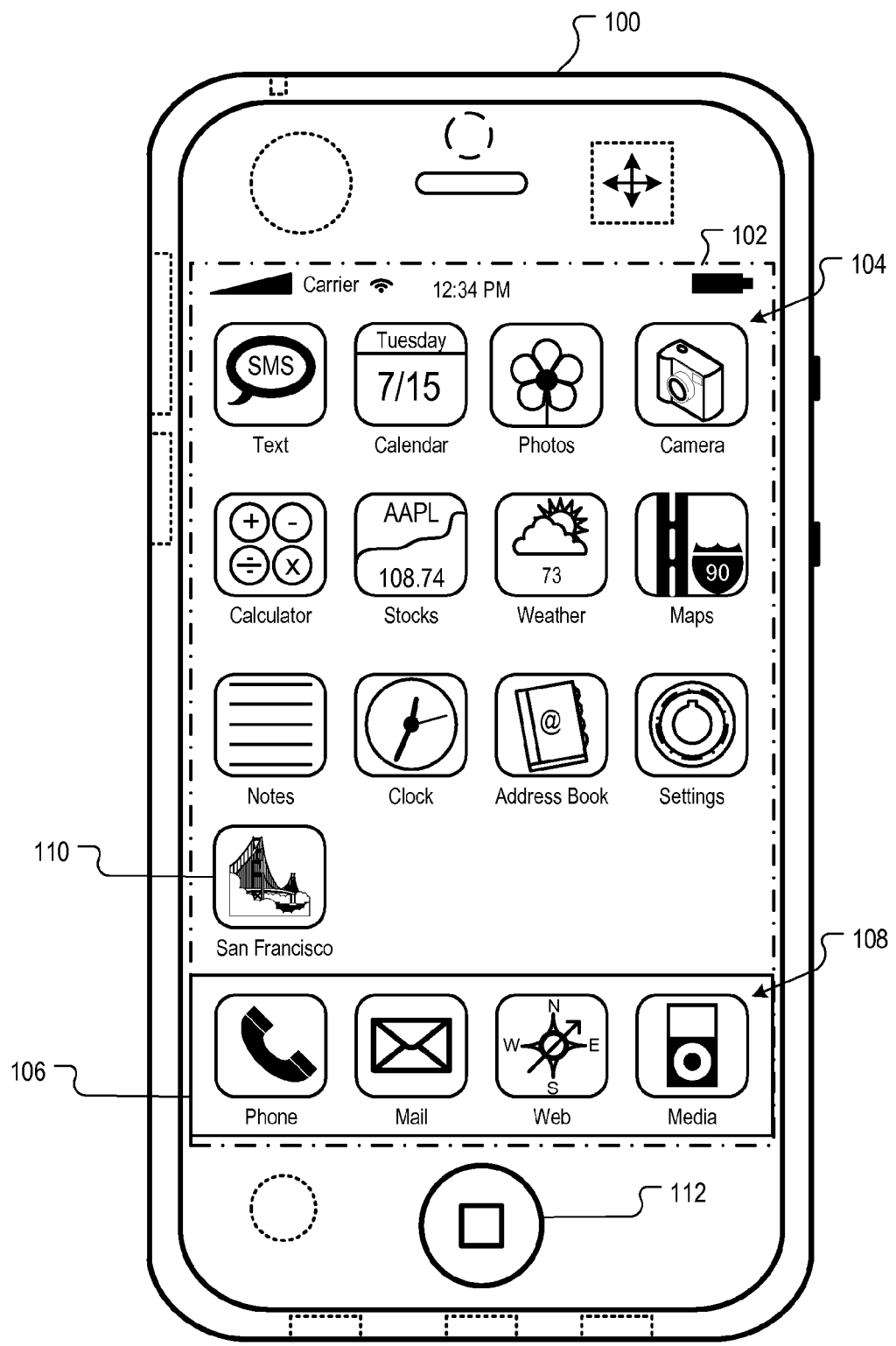
FIG. 1 illustrates an example user interface of a mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and U.S. Patent Publication 2002/0015024A1, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 108. In the example shown, the display objects 104, 108, are graphic representations of system objects. Some examples of system objects include device functions, applications, windows, files, alerts, events, or other identifiable system objects.

In some implementations, the mobile device 100 can implement multiple device functionalities, such as a telephony device, an e-mail device, a network data communication device, a Wi-Fi base station device (not shown); and a media processing device, as indicated by the media player object. In some implementations, particular display objects 104, e.g., a phone object, an e-mail object, a Web object, and a media player object, can be displayed in a menu bar 106. In some implementations, device functionalities can be accessed from a top-level graphical user interface, such as the graphical user interface illustrated in FIG. 1. Touching one of the display objects 104, 108 can, for example, invoke corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone display object, the graphical user interface of the touch-sensitive display 102 may present display objects related to various phone functions; likewise, touching of the email display object may cause the graphical user interface to present display objects related to various e-mail functions; touching the Web object may cause the graphical user interface to present display objects related to various Web-surfing functions; and touching the media player object may cause the graphical user interface to present display objects related to various media processing functions.

In some implementations, the top-level graphical user interface environment or state of FIG. 1 can be restored by pressing a button 112 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 104, such as a short messaging service (SMS) object, a calendar object, a photos object, a camera object, a calculator object, a stocks object, a weather object, a maps object, a notes object, a clock object, an address book object, and a settings object. Touching the SMS display object can, for example, invoke an SMS messaging environment and supporting functionality; likewise, each selection of a display object can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 104, 108 can be configured by a user, e.g., a user may specify which display objects 104, 108 are displayed, and/or may download additional applications or other software that provides other functionalities and corresponding display objects.

In some implementations, the mobile device 100 can include one or more input/output (I/O) devices and/or sensor devices. For example, a speaker and a microphone can be included to facilitate voice-enabled functionalities, such as phone and voice mail functions. In some implementations, an up/down button for volume control of the speaker and the microphone can be included. The mobile device 100 can also include an on/off button for a ring indicator of incoming phone calls. In some implementations, a loud speaker can be included to facilitate hands-free voice functionalities, such as speaker phone functions. An audio jack can also be included for use of headphones and/or a microphone.

In some implementations, a proximity sensor can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor can be utilized to facilitate adjusting the brightness of the touch-sensitive display 102. In some implementations, an accelerometer can be utilized to detect movement of the mobile device 100. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface to provide access to location-based services.

The mobile device 100 can also include a camera lens and sensor. In some implementations, the camera lens and sensor can be located on the back surface of the mobile device 100. The camera can capture still images and/or video.

The mobile device 100 can also include one or more wireless communication subsystems, such as an 802.11b/g communication device 186, and/or a Bluetooth™ communication device. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, a port device, e.g., a Universal Serial Bus (USB) port, or a docking port, or some other wired port connection, can be included. The port device can, for example, be utilized to establish a wired connection to other computing devices, such as other communication devices 100, network access devices, a personal computer, a printer, or other processing devices capable of receiving and/or transmitting data. In some implementations, the port device allows the mobile device 100 to synchronize with a host device using one or more protocols, such as, for example, the TCP/IP, HTTP, UDP and any other known protocol.

In some implementations, the display objects 104, 108 are used to invoke applications (e.g., location-aware applications) which be populated with data. An "application" can be a software program, utility, widget, gadget, user interface element (e.g., a menu, tool bar, pane), tool, operating system function or component, search engine, assistant, driver, etc. The data can be retrieved from a local storage device or from a network resource. To reduce clutter on the touch-sensitive display 102, the user can organize the applications into sets which can be more easily displayed, accessed and managed on the mobile device 100. For example, the user can create a set of location-aware applications that can be populated by transitional data sets. A transitional data set is a data set that can change based on the current location of the mobile device 100 as determined by a positioning technology (e.g., GPS, cell tower triangulation, Wi-Fi). In the example of FIG. 1, a display object 110 titled "San Francisco" is displayed on the touch sensitive display 102. When the user touches the display object 110, a set of location-aware applications can be accessed, as described in reference to FIG. 2.

In some implementations, the display object 110 can include indicia which indicates to the user their current location. In the example shown, the mobile device 100 is currently located in San Francisco, Calif. Thus the display object 110 displays an image of the Golden Gate Bridge. If the mobile device 100 was located in New York City, for example, then the display object 110 could display indicia relevant to New York City (e.g., an image of the NYC skyline), and the description "New York City" could be displayed under the display object 110.

Figure 3:
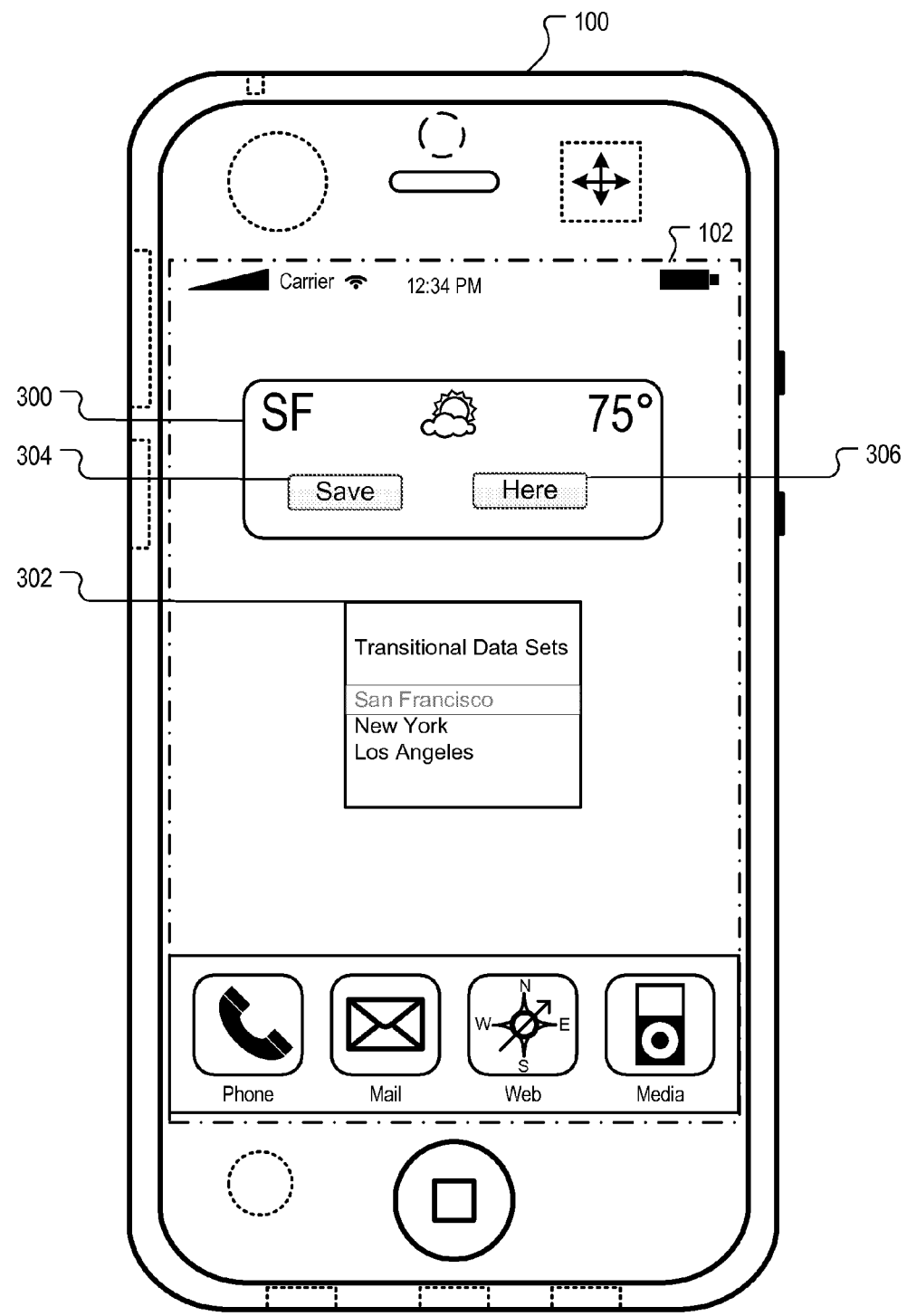
FIG. 3 illustrates an example location-aware application populated with a data from a transitional data set.

In some implementations, transitional data sets can be saved to the mobile device 100 or to a network device for future retrieval and/or comparison with other data sets. A user interface can provide a mechanism (e.g., a menu) listing the available transitional data sets and providing an indication of the most recent. For example, the user can tap or make a gesture on the touch sensitive display 102, which results in the display of a list of available transitional data sets. In the example of FIG. 3, transitional data sets are displayed in a list 302 for San Francisco, New York and Los Angeles.

Example Localized User Interface

Figure 2:
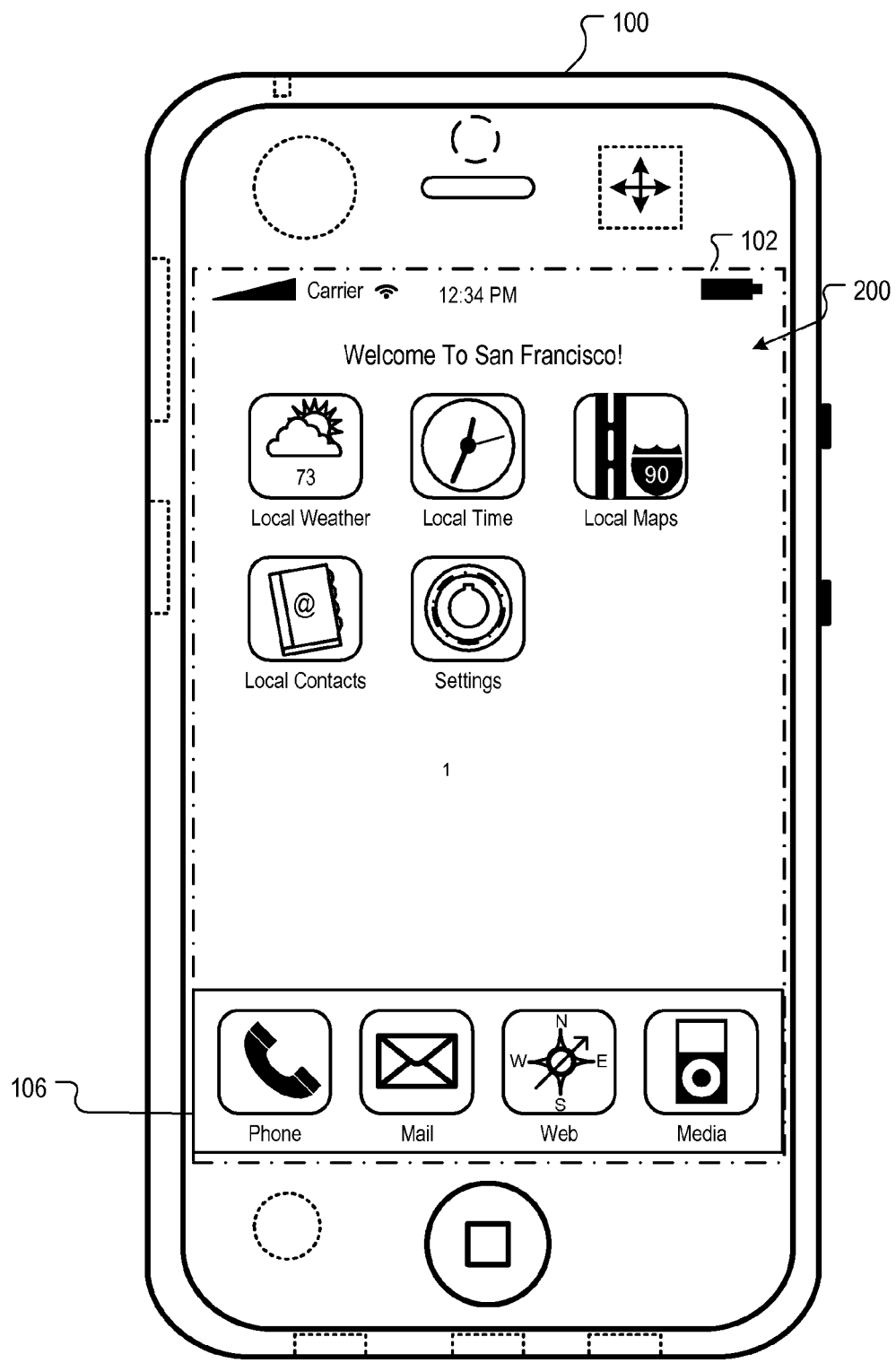
FIG. 2 illustrates an example user interface of a mobile device, displaying a set of location-aware applications.

FIG. 2 illustrates an example user interface of a mobile device, displaying a set of location-aware applications. In some implementations, display objects 200 corresponding to a set of location-aware applications can be displayed on the touch sensitive display 102 of the mobile device 100. In the example shown, applications for local weather, time, maps and contacts are included in the set of applications. The display objects 200 for some or all the applications can also be displayed in the menu bar 106 by, for example, dragging the display objects 200 onto the menu bar 106.

The touch sensitive display 102 can include various thematic elements for indicating a current location of the mobile device 100. In the example shown, a "Welcome To San Francisco!" message is displayed above the display objects 200 to remind the user of the current location. Other thematic visual or audio elements can be provided, such as symbols, colors, fonts, music, images of landmarks, backgrounds, banners, advertisements, ticker tape, animations, etc.

In some implementations, rather than have a separate user interface and applications for displaying a set of applications, the touch screen display 102 can become "live" with a current transitional data set. For example, the current weather and time can be displayed on the touch sensitive display 102. The transitional data can be displayed using animations, such as a rotating movie poster displaying local movie times, etc.

FIG. 3 illustrates an example location-aware application populated with data from a transitional data set. If the user touches or otherwise interacts with one of the display objects 200 shown in FIG. 2, then the application corresponding to the touched display object 200 is launched on the mobile device 100 and automatically populated with a transitional data set associated with the application. In the example shown, the user touched the display object 200 for local weather. Responsive to the touch, a local weather application (e.g., a weather widget) is launched and presents the local temperature for San Francisco in a display window 300. The transitional data used to populate the weather application (e.g., local temperature) can be retrieved from a network resource based on position coordinates of the mobile device 100. The position coordinates can be provided by the GPS, cellular tower triangulation, power signals, URLs, search queries, Wi-Fi networks (e.g., Skyhook™) or any other technology for determining location.

In some implementations, the transitional data can be saved to the mobile device 100 or a network device by touching the "Save" button 304, for example. The application can also display a "Here" button 306 or similar user interface element which, when touched by the user, causes the application to automatically populate with the transitional data. Otherwise, the application could display static, default data (e.g., the user's home location). In this latter implementation, touching the display object 110 in FIG. 1 would launch the application with static, default data, which could then be changed to local data by touching the "Here" button 306. For example, if the user's home is in New York, then the user may configure a "weather" widget to display weather in New York as a default, and such default information can be persistent. If the user travels to San Francisco, the user can touch the "Here" button 306 and the "weather" widget will automatically display the weather for San Francisco. If the user then touches the "Save" button 304, a transitional data set for San Francisco will be stored on the mobile device 100 or on a network device. Thus each time the user travels to San Francisco, the location-aware mobile device 100 can automatically populate the "weather" widget with transitional data associated with San Francisco. Once saved, the next time the user launches the widget, the "Save" button 304 can change to a "Delete" button to allow the user to delete the transitional data.

An advantage of using a transitional data set over a conventional persistent data set is that the location-aware application is automatically populated with transitional information, thus eliminating the need for the user to manually add or remove local information to a persistent data set associated with the application, which can be difficult and time consuming for the average user. Moreover, if the user travels frequently, adding local information to the persistent data set would use up storage capacity on the mobile device 100 that could be used for other purposes.

Example Process

Figure 4:
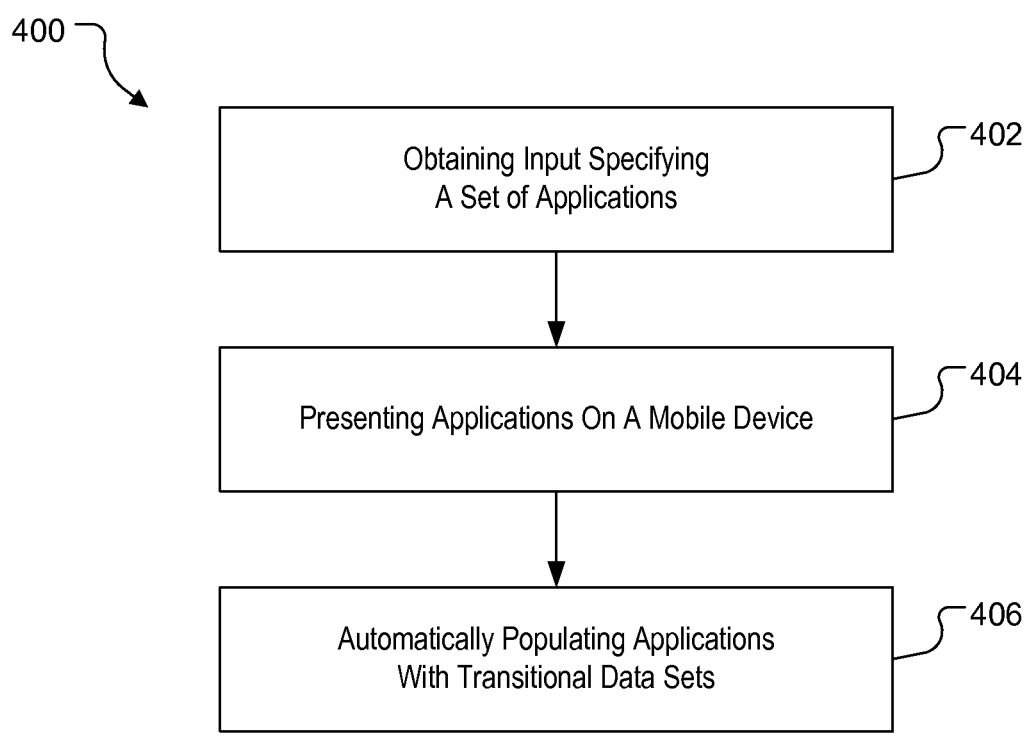
FIG. 4 is flow diagram of an example process for specifying, displaying and populating location-aware applications.

FIG. 4 is flow diagram of an example process 400 for specifying, displaying and populating location-aware applications. In some implementations, the process 400 begins by obtaining input specifying a set of applications (402), presenting the applications on a mobile device (404), and automatically populating the applications with transitional data sets associated with the applications (406). Specifying the applications can be facilitated by touching or interacting with display objects corresponding with location-aware applications, as described in reference to FIG. 1. The applications can be populated with transitional information, such as current location.

In general, any transitory data can be a trigger for an application on the mobile device 100. Other examples of transitional data can include data based on current temperature, time, day, month, season. For example, a temperature detected by a sensor on the mobile device 100 could trigger display of a temperature widget. In another example, a detected holiday can trigger a music widget that plays holiday music or change a ring tone if the mobile device 100 is a mobile phone.

In some implementations, differences between data in transitional or persistent data sets, or information based on such differences, can be presented on the mobile device 100. For example, time differences or temperatures differences between two different locations can be presented on the touch sensitive display 102.

In some implementations, an application (e.g., a widget) can advertise itself to the mobile device 100 that the application is location-aware, or transitional data aware, for a specific location. The advertisement can be done in a data driven manner using, for example, a resource in the application or a runtime call to an operating system service. The application resource or operating system service can then automatically populate or load the application with the transitional data, and the application can display the information. In some implementations, the application can display the data in a read-only manner (e.g., a weather widget without a backside to set location).

Exemplary Mobile Device Architecture

Figure 5:
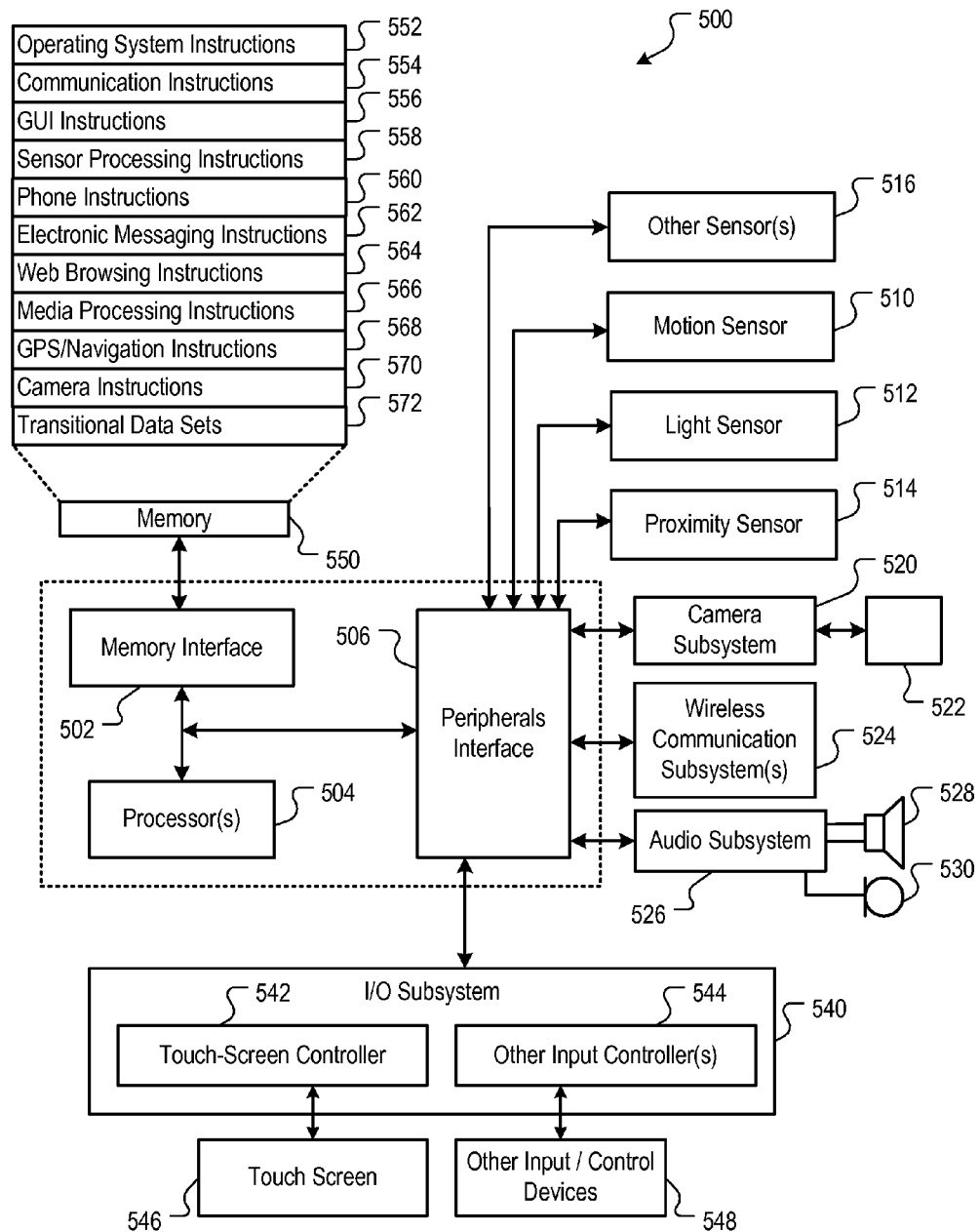
FIG. 5 is block diagram of an example architecture for the mobile device of FIG. 1.

FIG. 5 is a block diagram of an example architecture 500 of the mobile device 100 of FIG. 1. The mobile device 100 can include a memory interface 502, one or more data processors, image processors and/or central processing units 504, and a peripherals interface 506. The memory interface 502, the one or more processors 504 and/or the peripherals interface 506 can be separate components or can be integrated in one or more integrated circuits. The various components in the mobile device 100 can be coupled by one or more communication buses or signal lines.

Sensors, devices and subsystems can be coupled to the peripherals interface 506 to facilitate multiple functionalities. For example, a motion sensor 510, a light sensor 512, and a proximity sensor 514 can be coupled to the peripherals interface 506 to facilitate the orientation, lighting and proximity functions described with respect to FIG. 1. Other sensors 516 can also be connected to the peripherals interface 506, such as a positioning system (e.g., GPS receiver), a temperature sensor, a biometric sensor, or other sensing device, to facilitate related functionalities.

A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the mobile device 100 is intended to operate. For example, a mobile device 100 may include communication subsystems 524 designed to operate over a GSM network, a GPRS network, an EDGE network, a Wi-Fi or WiMax network, and a Bluetooth™ network. In particular, the wireless communication subsystems 524 may include hosting protocols such that the device 100 may be configured as a base station for other wireless devices.

An audio subsystem 526 can be coupled to a speaker 528 and a microphone 530 to facilitate voice-enabled functions, such as voice recognition, voice replication, digital recording, and telephony functions.

The I/O subsystem 540 can include a touch screen controller 542 and/or other input controller(s) 544. The touch-screen controller 542 can be coupled to a touch screen 546. The touch screen 546 and touch screen controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 546.

The other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of the speaker 528 and/or the microphone 530.

In one implementation, a pressing of the button for a first duration may disengage a lock of the touch screen 546; and a pressing of the button for a second duration that is longer than the first duration may turn power to the mobile device 100 on or off. The user may be able to customize a functionality of one or more of the buttons. The touch screen 546 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 32-pin connector that is compatible with the iPod™. Other input/output and control devices can also be used.

The memory interface 502 can be coupled to memory 550. The memory 550 can include high-speed random access memory and/or non-volatile memory, such as one or more magnetic disk storage devices, one or more optical storage devices, and/or flash memory (e.g., NAND, NOR). The memory 550 can store an operating system 552, such as Darwin, RTXC, LINUX, UNIX, OS X, WINDOWS, or an embedded operating system such as VxWorks. The operating system 552 may include instructions for handling basic system services and for performing hardware dependent tasks. In some implementations, the operating system 552 can be a kernel (e.g., UNIX kernel).

The memory 550 may also store communication instructions 554 to facilitate communicating with one or more additional devices, one or more computers and/or one or more servers. The memory 550 may include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes and instructions; camera instructions 570 to facilitate camera-related processes and functions; and transitional data sets 572 to facilitate processes and functions described in reference to FIGS. 1-4.

Each of the above identified instructions and applications can correspond to a set of instructions for performing one or more functions described above. These instructions need not be implemented as separate software programs, procedures or modules. The memory 550 can include additional instructions or fewer instructions. Furthermore, various functions of the mobile device 100 may be implemented in hardware and/or in software, including in one or more signal processing and/or application specific integrated circuits.

Network Operating Environment

Figure 6:
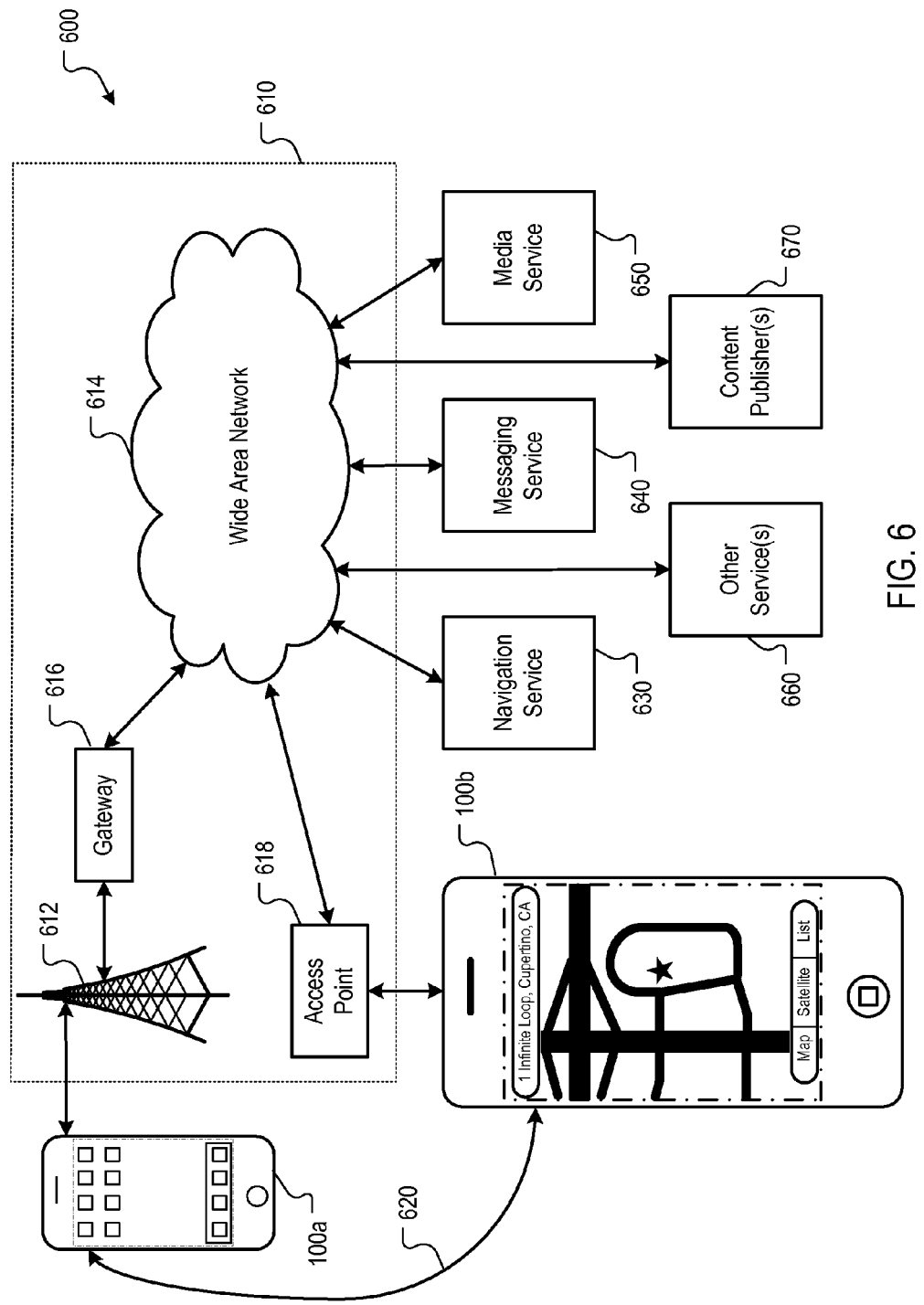
FIG. 6 illustrates an example operating environment for the mobile device of FIG. 1.

FIG. 6 is a block diagram of an example network operating environment 600 for the mobile device 100 of FIG. 1. The mobile device 100 of FIG. 1 can, for example, communicate over one or more wired and/or wireless networks 610 in data communication. For example, a wireless network 612, e.g., a cellular network, can communicate with a wide area network (WAN) 614, such as the Internet, by use of a gateway 616. Likewise, an access point 618, such as an 802.11g wireless access point, can provide communication access to the wide area network 614. In some implementations, both voice and data communications can be established over the wireless network 612 and the access point 618. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 612, gateway 616, and wide area network 614 (e.g., using TCP/IP or UDP protocols). Likewise, the mobile device 100*b* can place and receive phone calls, send and receive e-mail messages, and retrieve electronic documents over the access point 618 and the wide area network 614. In some implementations, the mobile device 100 can be physically connected to the access point 618 using one or more cables and the access point 618 can be a personal computer. In this configuration, the mobile device 100 can be referred to as a "tethered" device.

The mobile devices 100*a* and 100*b* can also establish communications by other means. For example, the wireless device 100*a* can communicate with other wireless devices, e.g., other wireless devices 100, cell phones, etc., over the wireless network 612. Likewise, the mobile devices 100*a* and 100*b* can establish peer-to-peer communications 620, e.g., a personal area network, by use of one or more communication subsystems. Other communication protocols and topologies can also be implemented.

The mobile device 100 can, for example, communicate with one or more services 630, 640, 650, and 660 and/or one or more content publishers 670 over the one or more wired and/or wireless networks 610. For example, a navigation service 630 can provide navigation information, e.g., map information, location information, route information, and other information, to the mobile device 100. In the example shown, a user of the mobile device 100*b* has invoked a map functionality, e.g., by pressing the maps object 144 on the top-level graphical user interface shown in FIG. 1, and has requested and received a map for the location "1 Infinite Loop, Cupertino, Calif."

A messaging service 640 can, for example, provide e-mail and/or other messaging services. A media service 650 can, for example, provide access to media files, such as song files, movie files, video clips, and other media data. One or more other services 660 can also be utilized by the mobile device 100.

The mobile device 100 can also access other data and content over the one or more wired and/or wireless networks 610. For example, content publishers, e.g., content publisher(s) 670, such as news sites, RSS feeds, web sites, blogs, social networking sites, developer networks, etc., can be accessed by the mobile device 100. Such access can be provided by invocation of a web browsing function or application (e.g., a browser).

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, e.g., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "system" encompasses all apparatus, systems, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code).

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of volatile (e.g., RAM) and non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube), LCD (liquid crystal display) monitor, touch sensitive device or display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of what being claims or of what may be claimed, but rather as descriptions of features specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method comprising:
   displaying, on a first user interface of a mobile device, a first set of graphical objects corresponding to a first group of applications that are configured for execution on the mobile device, the first group of applications including one or more applications that receive transitional data and one or more applications that do not receive transitional data;
   obtaining a current location of the mobile device;
   in response to obtaining the current location of the mobile device, dynamically modifying a display of a first object in the first set of graphical objects on the first user interface to provide a visual representation of the current location, the first object indicating an association with a second group of applications that are capable of receiving transitional data corresponding to the current location, wherein the second group of applications are configured for execution on the mobile device;
   obtaining a user selection of the first object; and
   in response to the user selection of the first object, replacing the first user interface with a second user interface of the mobile device that displays a second set of graphical objects corresponding to the second group of applications, the second group of applications limited to one or more applications that receive transitional data.

2. The method of claim 1, where the second group of applications is configured to present information based on differences between the transitional data and other data.

3. The method of claim 2, where the other data includes persistent data.

4. The method of claim 1, where the second user interface includes thematic elements related to the transitional data.

5. The method of claim 1, wherein the one or more applications that do not receive transitional data include a first application that is not configured to present information corresponding to the current location of the mobile device.

6. The method of claim 1, wherein the user selection corresponds to a touch input obtained through a touch sensitive display coupled to the mobile device.

7. A system comprising:
   at least one processor;
   at least one of memory or a computer-readable medium coupled to the processor and operable to store instructions, which, when executed by the at least one processor, cause the at least one processor to perform operations comprising:
   displaying, on a first user interface of a mobile device, a first set of graphical objects corresponding to a first group of applications that are configured for execution on the mobile device, the first group of applications including one or more applications that receive transitional data and one or more applications that do not receive transitional data;
   obtaining a current location of the mobile device;
   in response to obtaining the current location of the mobile device, dynamically modifying a display of a first object in the first set of graphical objects on the first user interface to provide a visual representation of the current location, the first object indicating an association with a second group of applications that are capable of receiving transitional data corresponding to the current location, wherein the second group of applications are configured for execution on the mobile device;
   obtaining a user selection of the first object; and
   in response to the user selection of the first object, replacing the first user interface with a second user interface of the mobile device that displays a second set of graphical objects corresponding to the second group of applications, the second group of applications limited to one or more applications that receive transitional data.

8. The system of claim 7, where the second group of applications is configured to present information based on differences between the transitional data and other data.

9. The system of claim 8, where the other data includes persistent data.

10. The system of claim 7, where the second user interface includes thematic elements related to the transitional data.

11. The system of claim 7, wherein the one or more applications that do not receive transitional data include a first application that is not configured to present information corresponding to the current location of the mobile device.

12. The system of claim 7, wherein the user selection corresponds to a touch input obtained through a touch sensitive display coupled to the mobile device.

13. A non-transitory computer-readable medium storing instructions, which, when executed by a processor, cause the processor to perform operations comprising:
   displaying, on a first user interface of a mobile device, a first set of graphical objects corresponding to a first group of applications that are configured for execution on the mobile device, the first group of applications including one or more applications that receive transitional data and one or more applications that do not receive transitional data;
   obtaining a current location of the mobile device;
   in response to obtaining the current location of the mobile device, dynamically modifying a display of a first object in the first set of graphical objects on the first user interface to provide a visual representation of the current location, the first object indicating an association with a second group of applications that are capable of receiving transitional data corresponding to the current location, wherein the second group of applications are configured for execution on the mobile device;

obtaining a user selection of the first object; and in response to the user selection of the first object, replacing the first user interface with a second user interface of the mobile device that displays a second set of graphical objects corresponding to the second group of applications, the second group of applications limited to one or more applications that receive transitional data.

14. The non-transitory computer-readable medium of claim 13, where the second group of applications is configured to present information based on differences between the transitional data and other data.

15. The non-transitory computer-readable medium of claim 14, where the other data includes persistent data.

16. The non-transitory computer-readable medium of claim 13, wherein the one or more applications that do not receive transitional data include a first application that is not configured to present information corresponding to the current location of the mobile device.

17. The non-transitory computer-readable medium of claim 13, where the second user interface includes thematic elements related to the transitional data.

18. The non-transitory computer-readable medium of claim 13, wherein the user selection corresponds to a touch input obtained through a touch sensitive display coupled to the mobile device.

19. A method comprising:

displaying, on a first user interface of a mobile device, a first set of graphical objects corresponding to a group of applications that are configured for execution on the mobile device, the group of applications limited to one or more applications that receive transitional data, wherein a first application in the first group of applications is configured to present information about a first stored location of the mobile device;

obtaining a first user selection of a first object in the first set of graphical objects, the first object corresponding to the first application;

executing the first application on the mobile device, including presenting a second user interface corresponding to the first application;

displaying, on the second user interface, first information corresponding to the first stored location;

obtaining a current location of the mobile device;

determining that the current location is different from the first stored location;

in response to determining that the current location is different from the first stored location, providing on the second user interface, in conjunction with the first information, a user-selectable first control option for presenting transitional data corresponding to the current location;

obtaining a second user selection of the first control option; and in response to obtaining the second user selection, displaying, on the second user interface, transitional data corresponding to the current location.

20. The method of claim 19, further comprising:

providing, on the second user interface in conjunction with the transitional data corresponding to the current location, a second control option for storing the current location;

obtaining a user selection of the second control option; and saving the current location as a second stored location of the mobile device.

* * * * *